United States Patent [19]

Paolo

[11] Patent Number: 5,007,127
[45] Date of Patent: Apr. 16, 1991

[54] HYDROBRUSH WITH SPEED-REDUCER OF THE EPICYCLIC TYPE

[75] Inventor: Bizzarri Paolo, Monte S. Pietro, Italy

[73] Assignee: Gordon S.n.C. di Bizzarri Paolo e C., Minerbio, Italy

[21] Appl. No.: 419,777

[22] Filed: Oct. 11, 1989

[30] Foreign Application Priority Data

Oct. 26, 1988 [IT] Italy ................. 15174 8/88

[51] Int. Cl.[5] ........................................... A46B 13/06
[52] U.S. Cl. ...................................................... 15/29
[58] Field of Search .............. 15/23, 24, 28, 29, 97 R, 15/50 R; 173/168

[56] References Cited

U.S. PATENT DOCUMENTS

| 2,221,315 | 11/1940 | Okun | 15/28 |
|---|---|---|---|
| 2,540,240 | 2/1951 | Boyle | 15/29 |
| 3,074,088 | 1/1963 | Williams | 15/29 |
| 4,084,281 | 4/1978 | Smith | 15/29 |
| 4,374,444 | 2/1983 | Zhadanov | 15/29 |
| 4,461,052 | 7/1984 | Mostul | 15/29 |
| 4,513,466 | 4/1985 | Keddie et al. | 15/29 |
| 4,686,729 | 8/1987 | Roman et al. | 15/29 |
| 4,763,373 | 8/1988 | Sanchez | 15/29 |
| 4,809,382 | 5/1989 | Raun | 15/29 |

FOREIGN PATENT DOCUMENTS

| 197038 | 4/1958 | Fed. Rep. of Germany | 15/29 |
|---|---|---|---|
| 767 | of 1867 | United Kingdom | 15/23 |
| 345861 | 4/1931 | United Kingdom | 15/29 |

Primary Examiner—Robert W. Jenkins
Assistant Examiner—Charles Cooley
Attorney, Agent, or Firm—Larson & Taylor

[57] ABSTRACT

A hydrobrush of the type incorporating a small Pelton turbine actuated by a water jet at the pressure of the water main and which causes the rotation of a brush. The impeller (4) of said turbine is provided with a co-axial small toothed wheel (504) which is in mesh with two or more toothed wheels or satellites (5) of larger diameter, which in turn are in mesh with a crown gear (303) which surrounds them and is secured to the body (3) of said hydrobrush.

3 Claims, 2 Drawing Sheets

HYDROBRUSH WITH SPEED-REDUCER OF THE EPICYCLIC TYPE

BACKGROUND OF THE INVENTION

Hydrobrushes are known which incorporate a small Pelton turbine the impeller of which is rotated by a jet of water delivered at the pressure of the water main. Said impeller entrains into rotation a brush which is constantly wetted by the water that has produced the rotation of said impeller. In certain cases, the brush is keyed directly on the shaft of the impeller, while in other cases the rotation of the impeller is transmitted to the shaft of the brush through the intermediary of a speed-reducing gear. In this case, the torque on the shaft of the brush is increased, whereby the latter can be used for the strong cleaning of surfaces of any nature or for hydro-massage. The hydrobrushes of this latter type, made according to the known art, are considerably bulky, comprise a considerable number of components and are not quite reliable.

SUMMARY OF THE INVENTION

These and further drawbacks of the prior art hydrobrushes are overcome by the hydrobrush according to the invention, according to which a hydrobrush of the type incorporating a small Pelton turbine actuated by a water jet at the pressure of water main and which causes the rotation of a brush, characterized in that the impeller of said turbine is provided with a co-axial toothed wheel which is in mesh with two or more toothed wheels or satellites of larger diameter carried by a rotatable support, the said satellites being in turn in mesh with a crown gear secured to the body of said hydrobrush, the said support being in turn axially connected to the said brush so as to cause the rotation of the brush.

BRIEF DESCRIPTION OF THE DRAWINGS

Further characteristics of the hydrobrush according to the invention and the advantages resulting therefrom will be apparent from the following description made with reference to the accompanying drawings, wherein.

DESCRIPTION OF THE PREFERRED EMBODIMENT OF THE INVENTION

Figure 1:
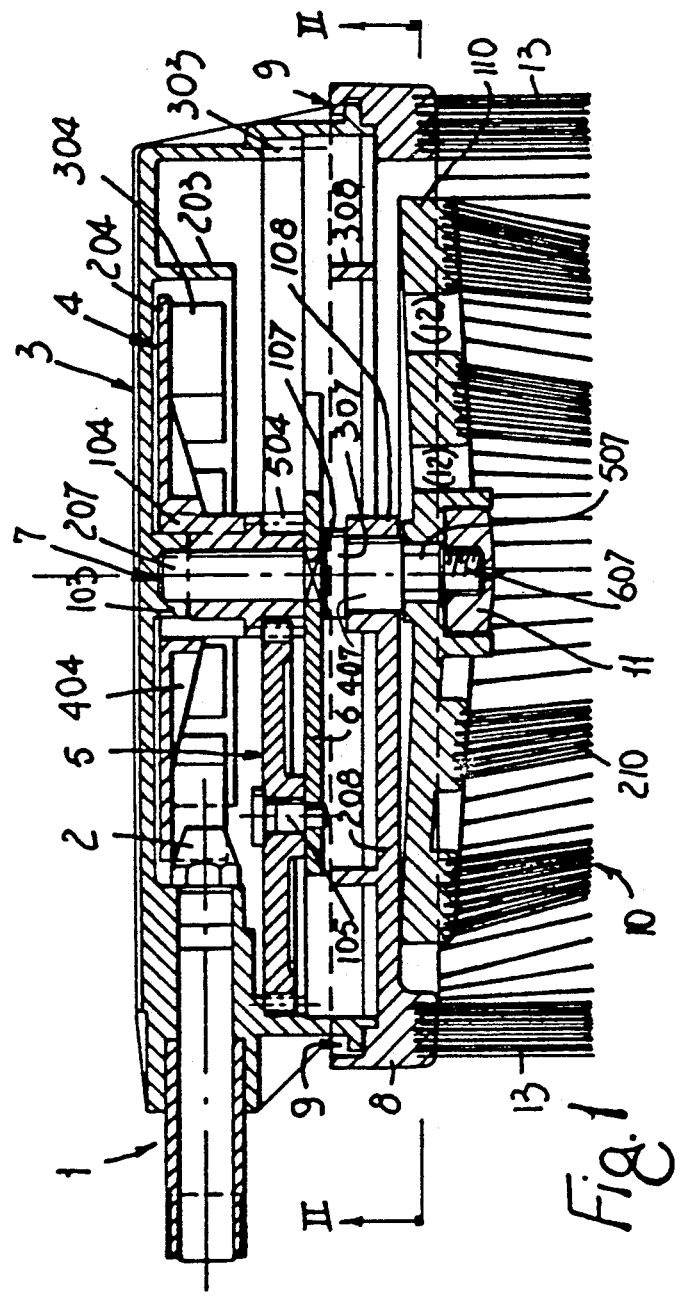
FIG. 1 is a sectional view of the hydrobrush, taken along a vertical plane passing through the axis of rotation of the brush.
Figure 2:
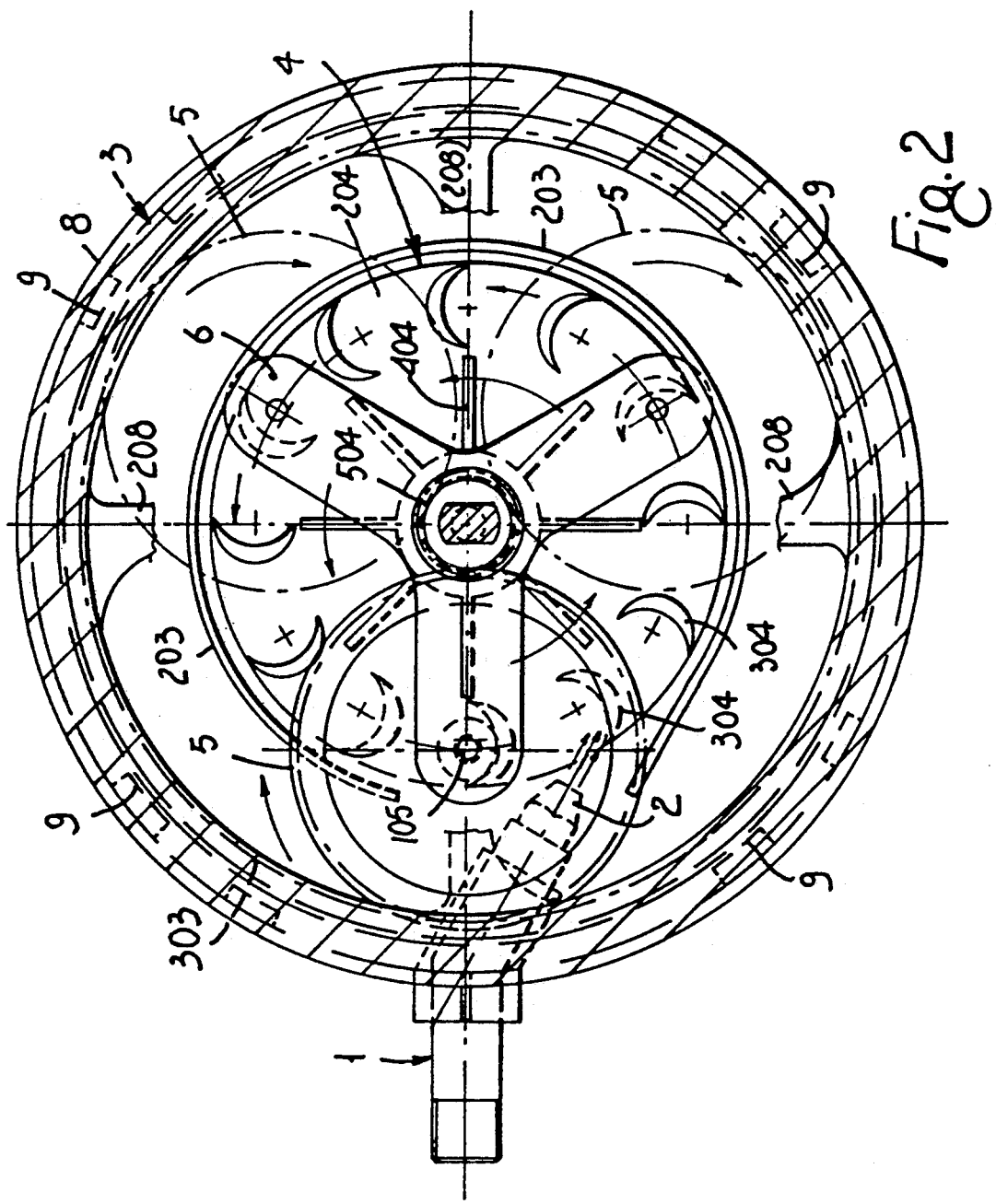
FIG. 2 is a sectional view of the hydrobrush of FIG. 1, taken along the horizontal plane passing through line II—II of FIG. 1.

In the Figures, 1 indicates a tubular composite connection adapted for coupling to a handle (not shown) provided, in usual manner, with means for the connection in a water-tight manner to the water main through a flexible hose. The other end of the tubular connection 1 mounts a calibrated nozzle 2 which is oriented tangentially within a bell-shaped body S which is suitably adapted to accomodate said components 1 and 2. Provided co-axially and internally on the bottom of the body S is a bushing 103, of round cross-section, whereon is rotatably mounted, by means of its hollow hub 104, the impeller 4 of the turbine which is apt to be actuated by the water jet from the nozzle 2. The impeller is provided with a disc-shaped body 204 of circular shape in plan view and is provided, on the periphery of its lower face, with identical integral vanes 304 which are equally spaced angularly, which have a crescent-shape in plan view and which are disposed so that during the rotation of the impeller they are directed with their concave faces in the direction of the nozzle 2, to be struck perpendicularly by the water jet from said nozzle. The numeral 404 indicates reinforcing ribs connecting the impeller body 204 to the hub 104. In order to improve the action of the jet against the vanes 304, the impeller 4 is surrounded by a small side enclosure 203 formed integrally with the body S and suitably opened at the nozzle 2.

The hub 104 of the impeller 4, finally, is characterized in that it comprises integrally and co-axially a small toothed wheel 504 which is constantly in mesh with three toothed wheels of larger diameter, designated satellites hereinafter, which are equal to each other and which, in turn, are rotatably mounted at the ends of a spider-like support 6 which is axially keyed to a portion 107, having opposite facings, of a shaft 7 comprising a portion 207 which is passed rotatably through the assembly 104-504 of the impeller 4 and is rotatably engaged in the bushing 103. The numeral 105 indicates the screws secured to the ends of the support 6 and constituting the axial supporting pins for the satellites 5. The support 6 is held in the correct axial co-operation with the shaft 7 by abutting against the toothed wheel 504 and against an opposite shoulder 307 of said shaft 7. The other face of the shoulder 307 abuts against the bushing 108 which is rotatably engaged by a portion 407 of said shaft 7 and which is integral with four spokes 208 which are equally-spaced angularly and are integral with a collar 8 to be secured to the edge of the body 3 by means of a conventional bayonet connection 9. An annular ridge 308, secured intermediately to the spokes 208 and concentric with the collar 8, serves mainly to stiffen said spokes.

The satellites 5 are in mesh with a crown gear 303 which is secured to the body S and is mounted co-axially therein.

The shaft 7 protrudes from the bushing 108 with a fraction of the portion 407 and with two consecutive portions 507-607 the former of which is provided with opposite facings for locking to the body 110 of a brush 10 provided with front bristles 210, while the latter portion 607 is threaded to receive a nut 11 for locking the brush 10 axially. The body of the brush 10 is provided with concentric sector openings 12 for the purpose specified hereinafter. The hydrobrush of the invention, finally, may be provided with an apron of bristles 13 secured to the collar 8 and surrounding the brush 10 with a suitable clearance.

The operation of the just described device is simple and apparent. The rotation of the impeller 4, caused by the action of the water jet from the nozzle 2, through the toothed wheel 504 promotes the rotation of the satellites 5 which due to the meshing engagement with the outer crown gear 303 are compelled to effect a movement of revolution around the drive wheel 504, with an angular speed depending upon the gear ratio of the epicyclic gear. The support 6 carrying the satellites 5 and therewith the shaft 7 and associated brush 10 rotate at an angular speed which is lower than that of the impeller 4 but with a torque which is considerably higher than that which can be obtained by keying the brush 10 directly on the impeller shaft. Thanks to this considerable torque, the hydrobrush according to the invention permits an efficient and strong cleaning of surfaces of any nature and can be used efficently as well for hydro-massage.

The water that has caused the rotation of the impeller 4 also reaches the bristles 210 of the brush 10 through the sector openings 12.

Evidently, the unique epicyclic reducer incorporated in the hydrobrush is subjected to uniformly balanced stresses and, therefore, the operation of the hydrobrush will be reliable. All the parts constituting the hydrobrush, preferably, are made of plastics material, but it is not to be excluded that in order to improve the "flywheel effect", the satellites 5 may be made of metal thoroughly or partly.

I claim:

1. A hydrobrush comprising:
   an enclosed housing including (a) an outer body (3) having a top, a peripheral side depending from said top and having an inner crown gear (303), and an upper bushing (103) depending from and integrally formed with said top, and (b) a collar (8) which is secured to said peripheral side of said body, said collar including a lower bushing (108) and spokes (208) which mount said lower bushing beneath said upper bushing;
   a small Pelton turbine disposed in said enclosure, said turbine including a water jet means which is connectable to a pressure of a water main for producing a driving water jet and an impeller which is rotatable mounted about said upper bushing and disposed to be rotated by the water jet, said impeller including a hub (104) having an integral toothed wheel (504);
   a shaft (7) including an upper end portion (207) which is rotatably mounted by said upper bushing, an intermediate portion (107) which extends through said hub of said impeller, a further portion (407) which is rotatably mounted by and which extends through said lower bushing, and a lower end portion (507-607);
   a support (6) which is keyed to said intermediate portion of said shaft for rotation therewith;
   a plurality of satellite gears mounted for rotation to said support and meshingly engaging both said toothed wheel of said hub and said inner crown gear of said outer body, said satellite gears having a diameter greater than that of said toothed wheel such that rotation of said impeller and toothed wheel thereof causes a lower rate of rotation with greater torque of said satellite gears, said support member and said shaft; and
   a cleaning brush which is attached to said lower end portion of said shaft for rotation therewith.

2. A hydrobrush as claimed in claim 1 wherein said turbine further includes a side enclosure surrounding said impeller which is integral with and which depends from said top of said outer body.

3. A hydrobrush as claimed in claim 2 wherein said shoulder is provided on said shaft between said intermediate portion and said further portion whereby said shoulder abuts said lower bushing; and wherein said support abuts said shoulder and said hub of said impeller.

* * * * *